United States Patent
Sato

(10) Patent No.: US 7,532,951 B2
(45) Date of Patent: May 12, 2009

(54) METHOD OF AUTOMATICALLY SETTING VIBRATION SUPPRESSION FILTER

(75) Inventor: Kazuo Sato, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/571,701

(22) PCT Filed: Sep. 9, 2004

(86) PCT No.: PCT/JP2004/013141

§ 371 (c)(1),
(2), (4) Date: Mar. 13, 2006

(87) PCT Pub. No.: WO2005/026859

PCT Pub. Date: Mar. 24, 2005

(65) Prior Publication Data

US 2007/0061047 A1    Mar. 15, 2007

(30) Foreign Application Priority Data

Sep. 12, 2003    (JP) ............................. 2003-320989

(51) Int. Cl.
*G01M 1/38* (2006.01)
(52) U.S. Cl. ................. 700/280; 700/170; 700/275; 73/579
(58) Field of Classification Search ........... 700/280, 700/170; 73/579, 1.48, 659, 570
See application file for complete search history.

(56) References Cited

U.S. PATENT DOCUMENTS

| | | | | |
|---|---|---|---|---|
| 5,333,819 A | * | 8/1994 | Stetson, Jr. .................. | 244/164 |
| 5,912,821 A | * | 6/1999 | Kobayashi .................. | 700/280 |
| 6,036,162 A | * | 3/2000 | Hayashi ...................... | 248/550 |
| 2002/0093754 A1 | * | 7/2002 | Zhang et al. ............. | 360/77.04 |
| 2003/0029240 A1 | * | 2/2003 | Kozaki ........................ | 73/579 |

FOREIGN PATENT DOCUMENTS

| | | |
|---|---|---|
| JP | 5-346813 A | 12/1993 |
| JP | 2000-148207 A | 5/2000 |
| JP | 2003-53643 A | 2/2003 |
| JP | 2004-886702 A | 3/2004 |

\* cited by examiner

*Primary Examiner*—Kidest Bahta
*Assistant Examiner*—Nathan Laughlin
(74) *Attorney, Agent, or Firm*—Sughrue Mion, PLLC

(57) ABSTRACT

A filter is set by a control apparatus automatically detecting a vibration frequency and determining a filter to be needed, in a simple method that does not require a special process.

A servo control apparatus which drives a servo motor includes a vibration detection section which detects vibration of a control system, and a vibration frequency measuring and analyzing section. The vibration detection section detects the vibration when the vibration is generated during driving. The vibration frequency measuring and analyzing section measures a frequency of which vibration frequency component is large. Then, a frequency of a vibration suppression filter is set based on the vibration frequency.

2 Claims, 3 Drawing Sheets

METHOD OF AUTOMATICALLY SETTING VIBRATION SUPPRESSION FILTER

TECHNICAL FIELD

The present invention relates to a method of setting a filter, when a machine or the like vibrates in a servo control apparatus which drives a servo motor, by detecting vibration and calculating a frequency having a large frequency component.

BACKGROUND ART

In the related art, as shown in FIG. 7, a signal output of a frequency analyzing device or an FFT (Fast Fourier Transform) analyzing device is connected to a command input (for example, a speed command) of a servo, and a detection output of a servo control apparatus, for example, a motor speed, is inputted to the frequency analyzing device. In FIG. 7, 6 denotes a motor, 7 denotes an encoder, 8 denotes a load machine, 12 denotes a servo control apparatus, and 11 denotes an FFT analyzing and measuring device.

The frequency analyzing device outputs a signal, in which a frequency is swept, to the servo control apparatus, performs an FFT analysis on a speed waveform of a motor driven by the servo control apparatus, and obtains a frequency of vibration. Alternatively, frequency characteristic of a servo system is obtained from an FFT analysis result of the swept waveform and the motor speed waveform, and the vibration frequency is specified. A parameter of a vibration suppression filter (for example, notch filter, low pass filter, etc.) for cutting off a resonance frequency is set from the vibration frequency obtained as described above.

For example, a resonance frequency f0 is obtained from a graph of FIG. 5(i), and a cutoff frequency of the filter is combined with f0 as shown in a graph of FIG. 5(ii). In addition, as disclosed in Patent Document 1, a signal in which the frequency is varied and which has a fixed amplitude is inputted to the servo control apparatus, the frequency analysis is performed on the motor speed signal, a position signal of a movable table in a machine, or the like, the resonance frequency is obtained, and a parameter of the filter is determined so as to cut off the resonance frequency.

Patent Document 1: JP-A-05-346813

DISCLOSURE OF THE INVENTION

Problems to be Solved in the Invention

However, in the related art, in order to obtain the frequency characteristic, a dedicated measurement device or the like is needed, and a user needs to set a desired condition of a desired amplitude or the like by using a frequency for frequency sweep and a speed signal. For example, when the condition is set wrong, there is a problem such as when the signal is small, it is difficult to measure the signal accurately, and when the signal is large, large resonance is generated which may break the machine.

As a result, a process of performing the FFT analysis is troublesome, and when there are some peaks in the measured data, necessary frequency needs to be extracted. Further, the user needs to select which filter is needed from the vibration frequency, and set the filter in a servo, the filter corresponding to a time constant of a reciprocal of the frequency. Therefore, it is very difficult to set the filter automatically.

Since the measurement device mechanically performs the frequency sweep in the measurement of the frequency characteristic, there is a problem such as once the load machine starts vibration, the load machine continuously vibrates until the load machine stops emergently. In such a case, a vibration status of the load machine may be continued for a while since the vibration status is not promptly suppressed.

Here, an object of the invention is to set a frequency of a filter, by a control apparatus automatically detecting a vibration frequency, and determining which filter is needed to remove a certain frequency component, in a simple method that does not require a special process.

Means for Solving the Problems

In order to solve the above-described problems, sampling of data such as torque or a difference between an estimated speed and a speed is performed for every predetermined time. When a vibration detection section detects vibration exceeding a predetermined level, a frequency of the data is analyzed. Then, some high frequencies are calculated from frequency components thereof. A desired filter is selected which is capable of cutting off a frequency equal to or higher than a frequency of which value corresponding a vibration energy is large, or cutting off a corresponding frequency band in accordance with the frequency.

As described above, it is possible to perform the calculation by a simple method as necessary, and automatically set the filter online by using the control apparatus alone.

EFFECTS OF THE INVENTION

According to the invention, there is an advantage that it is possible to automatically set the frequency of the desired filter online, as necessary, and by a simple method.

BRIEF DESCRIPTION OF THE DRAWINGS

FIG. 5(ii) illustrates a frequency characteristic when the filter is used.

REFERENCE NUMERALS

1 VIBRATION DETECTION SECTION
2 MICROCOMPUTER
3 CURRENT AMPLIFIER
4 BASE DRIVE CIRCUIT
5 POWER TRANSISTOR MODULE
6 MOTOR
7 ENCODER
8 LOAD MACHINE
9 DATA TRACE SECTION
10 FREQUENCY ANALYZING SECTION
11 FFT ANALYZING AND MEASURING DEVICE
12 SERVO CONTROL APPARATUS

BEST MODE FOR CARRYING OUT THE INVENTION

Hereinafter, a specific embodiment according to the present invention will be described with reference to FIG. 1.

Embodiment

Figure 1:
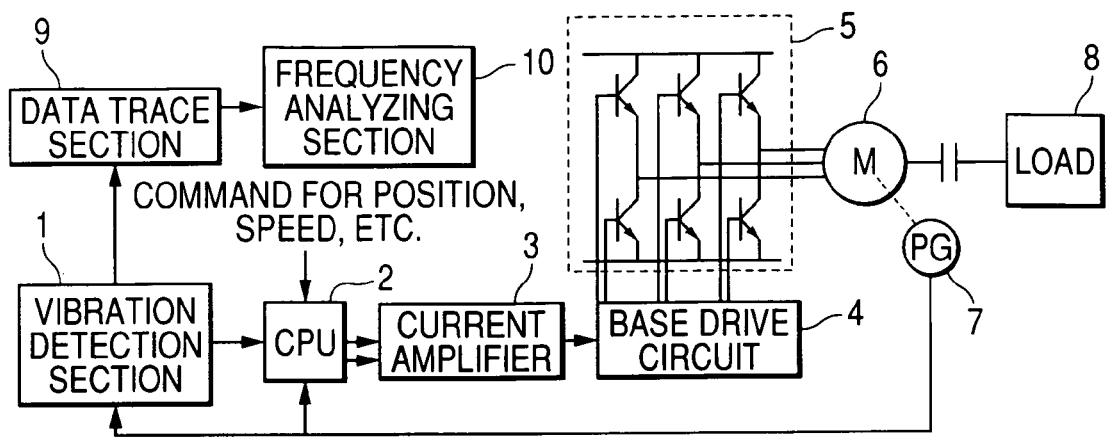
FIG. 1 is a block diagram illustrating a specific embodiment according to the present invention.

In FIG. 1, 1 denotes a vibration detection section, 2 denotes a microcomputer, 3 denotes a current amplifier, 4 denotes a base drive circuit, 5 denotes a power transistor module, 6 denotes a motor, 7 denotes an encoder, 8 denotes a load machine, 9 denotes a data trace section, and 10 denotes a frequency analyzing section.

In a circuit configured as described above, operations of the circuit will be described with reference to the timing diagram in FIG. 4.

First, the microcomputer 2 receives a command for position, speed, etc. from an external controller or the like.

Then, in a case of the speed command, for example, the microcomputer 2 controls the speed, controls a current by a current command which is an output thereof, and controls the motor 6 by driving the power transistor 5 through the base drive circuit 4.

Figure 2:
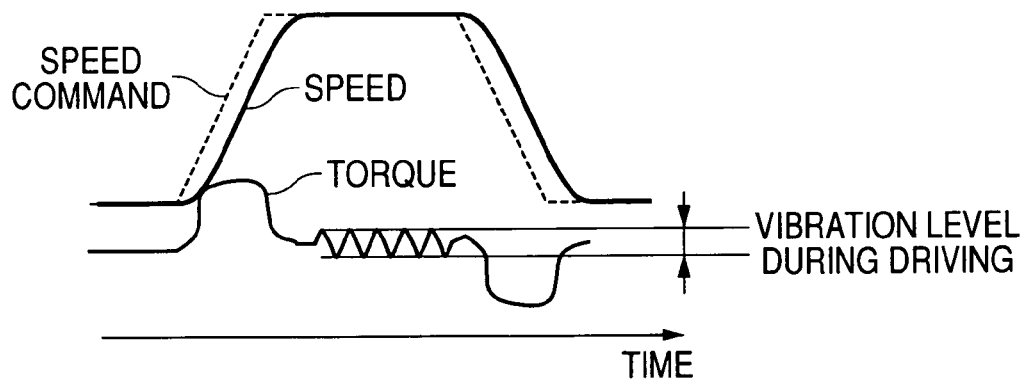
FIG. 2 is a diagram illustrating a measurement timing of a speed command, a speed, a waveform of torque and a vibration level during normal driving.

Here, as shown in FIG. 2, the microcomputer 2 performs data trace of data of torque or a difference between an estimated speed and a speed, for example at a constant speed driving, in normal driving. Here, when vibration is generated during rapid traverse, the vibration detection section 1 detects the vibration.

Figure 3:
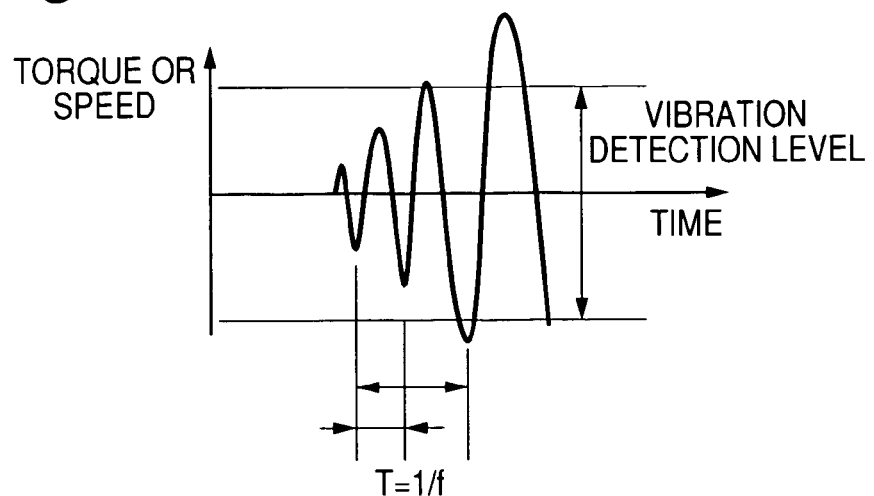
FIG. 3 is an example of a vibration waveform.

Here, when vibration component included in a torque command or a speed signal of the motor exceeds a predetermined level, the vibration detection section 1 detects the vibration. As a detecting level, for example as shown in FIG. 3, a machine-specific vibration amplitude level during driving is detected by performing normal driving or driving. In this figure, a maximum value of the vibration amplitude of the torque during the normal driving is detected. The vibration detection level may be about three times as much as the vibration level during the normal driving. When the vibration is detected, the frequency analysis section 10 performs a frequency analysis of the traced data at that time. Then, the frequency component having high frequency spectrum, or the frequency of which value corresponding to a vibration energy is large (the frequency of which value obtained by multiplying the frequency and the amplitude is large, or of which second power of that value is large), etc. is selected (f0 in FIG. 4(ii)). When the selected vibration frequency f0 or the frequency around the vibration frequency f0 is set to a vibration suppression filter, for example, a notch frequency of a notch filter, it is possible to control a frequency response of the load machine having resonance and anti-resonance as shown in FIG. 5(i) so as to suppress the resonance as shown in FIG. 5(ii). Alternatively, the same effect may be obtained by setting a cutoff frequency of a low pass filter based on f0. In this case, the cutoff frequency of the low pass filter may be set as a multiplication of the measured f0 by a predetermined constant number.

A series of operations according to the invention will be described with reference to a flowchart in FIG. 6. In step ST1, the data trace section 9 performs the data trace of the torque, the speed, or the like. Next, in step ST2, the vibration detection section 1 checks whether the vibration is generated. When the vibration is generated, the frequency analyzing section 10 performs the frequency analysis of the data obtained by the data trace section 9 in step ST3. Next, in step ST4, a determination of the frequency is performed. As described above, the frequency having the high frequency spectrum or the frequency of which value corresponding to the vibration energy is large is selected. In addition, in a case where calculation is performed using data taken for several times while the vibration is generated, it is easy to perform the determination when the frequency of which value corresponding to the vibration energy is large is selected based on the data taken for several times. Next, as in step ST5, when the vibration frequency is higher than a frequency determined according to a control capacity, when the vibration suppression filter which cuts off neighborhood of the frequency, such as the notch filter, is selected as in step ST6A. When the vibration frequency is lower, the vibration suppression filter which cuts off a frequency equal to or above the selected frequency, such as the low pass filter, is selected as in step ST6B. Then, a time constant of the filter, etc. is set. Since the frequency determined by the control capacity may affect a control gain, when the frequency is, for example, up to about 400 Hz, the frequency is determined according to the control capacity, etc., by a reason such as the low pass filter or the like is used.

The data to be analyzed may be any data other than the difference between the speed and the estimated speed as long as the data reflects the vibration, and the data may be the torque or the like. The difference between the speed and the estimated speed is obtained by, for example, calculating the speed while considering the load based on the torque command, taking the difference between the speed estimated by an observer and the speed, or the like. In addition, the microcomputer 2 may operate as the vibration detection section 1, the data trace section 9 and the frequency analyzing section 10.

As described above, it is possible to set a desired filter as necessary when the vibration, the resonance, etc. is generated. After the vibration suppression filter is set, a checking of the filter may be performed.

In addition, since only the resonance frequency is obtained unlike in a case of analyzing the frequency continuously, it is possible to separate the resonance frequency from a vibration component of a control system.

INDUSTRIAL APPLICABILITY

According to the present invention, in a robot, a numerical control apparatus or the like, it is possible to, by a servo control apparatus which drives a servo motor, detect vibration when a load machine vibrates, obtain a frequency of which vibration frequency component is large, and automatically set a vibration suppression filter of the servo control apparatus.

DRAWINGS

[FIG. 1]
 9: DATA TRACE SECTION
 10: FREQUENCY ANALYZING SECTION
 1: VIBRATION DETECTION SECTION
 3: CURRENT AMPLIFIER
 4: BASE DRIVE CIRCUIT
 #1: COMMAND FOR POSITION, SPEED, ETC.

[FIG. 2]
 #1: SPEED COMMAND
 #2: SPEED
 #3: TORQUE
 #4: VIBRATION LEVEL DURING DRIVING
 #5: TIME

[FIG. 3]
 #1: TORQUE OR SPEED
 #2: VIBRATION DETECTION LEVEL
 #3: TIME

Figure 4I:
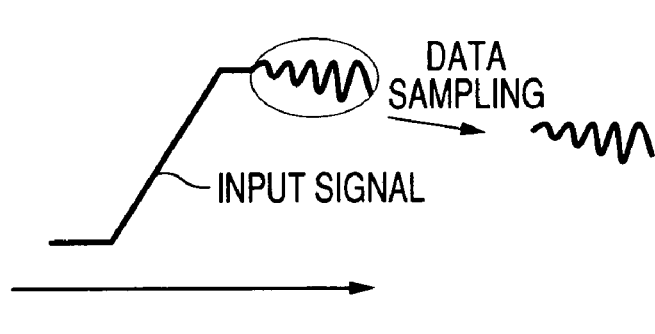
FIG. 4 is a diagram illustrating a setting timing.

[FIG. 4(i)]
1: DATA SAMPLING
2: INPUT SIGNAL

Figure 4:
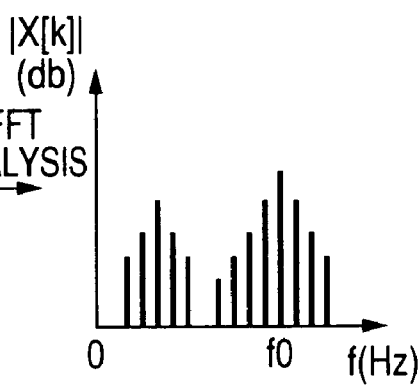
Figure 5I:
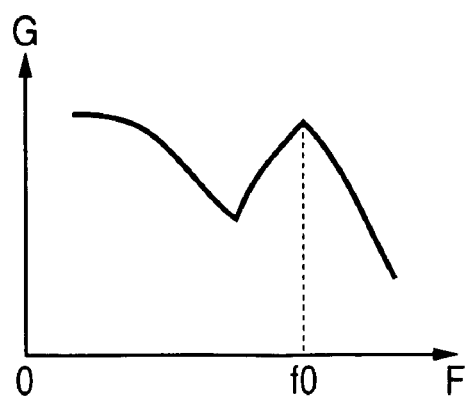
FIG. 5(i) illustrates a frequency characteristic without a filter.
Figure 5:
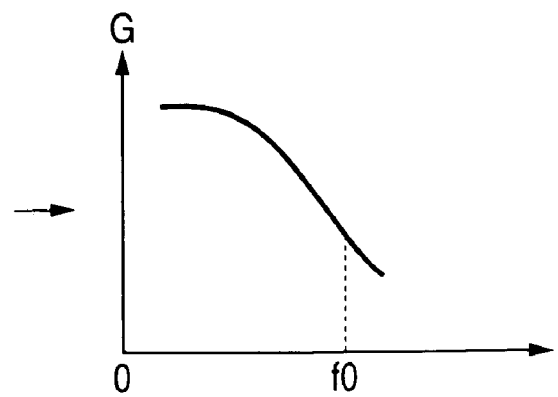
FIG. 5 illustrates a frequency characteristic of a load machine.

[FIG. 4(ii)]
3: FFT ANALYSIS

Figure 6:
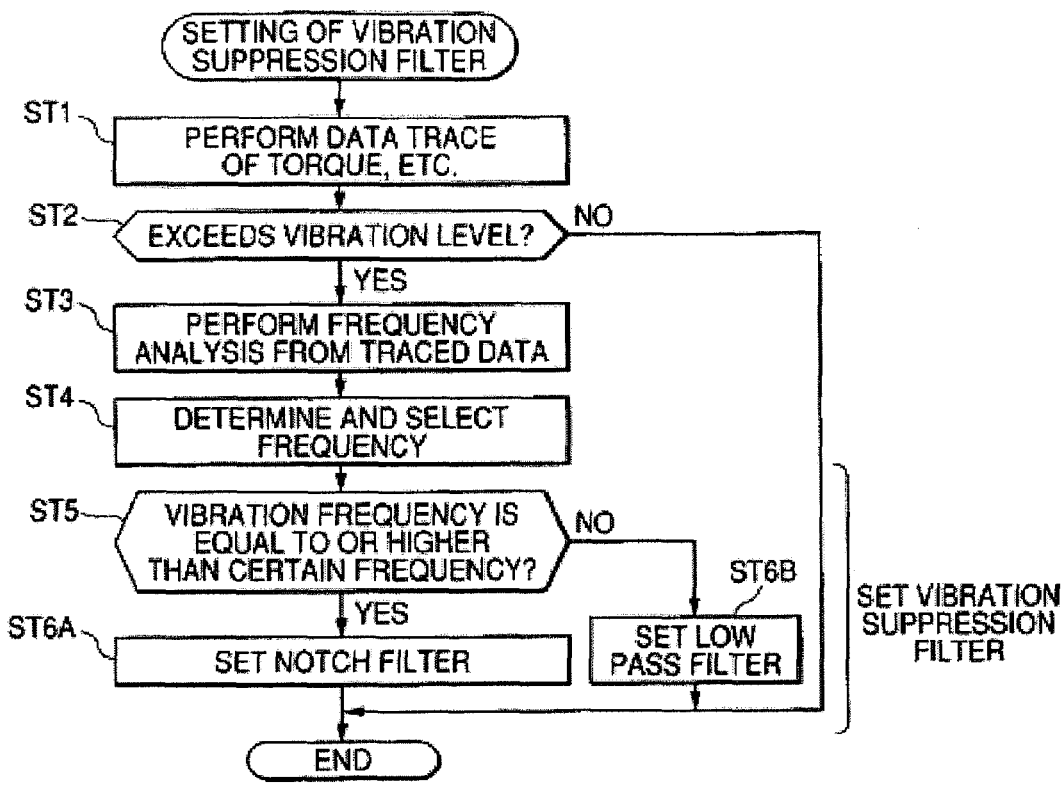
FIG. 6 is a schematic flowchart of setting a vibration suppression filter according to the invention.

[FIG. 6]
1: SETTING OF VIBRATION SUPPRESSION FILTER
ST1: PERFORM DATA TRACE OF TORQUE, ETC.
ST2: EXCEEDS VIBRATION LEVEL?
ST3: PERFORM FREQUENCY ANALYSIS FROM TRACED DATA
ST4: DETERMINE AND SELECT FREQUENCY
ST5: VIBRATION FREQUENCY IS EQUAL TO OR HIGHER THAN CERTAIN FREQUENCY?
ST6A: SET NOTCH FILTER
ST6B: SET LOW PASS FILTER
3: SET VIBRATION SUPPRESSION FILTER
2: END

Figure 7:
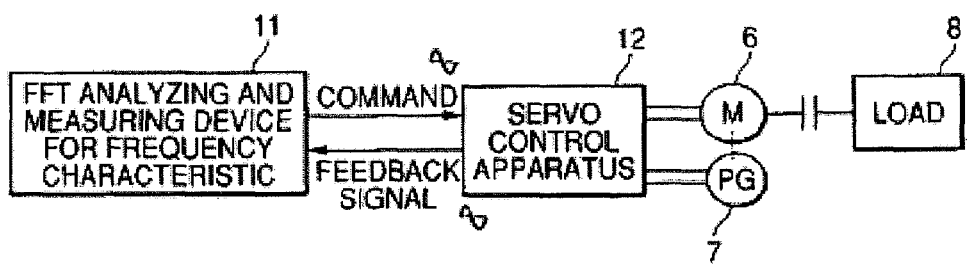
FIG. 7 is a block diagram according to an embodiment of the related art.

[FIG. 7]
11: FFT ANALYZING AND MEASURING DEVICE FOR FREQUENCY CHARACTERISTIC
12: SERVO CONTROL APPARATUS
1: COMMAND
2: FEEDBACK SIGNAL

The invention claimed is:

1. A method of automatically setting a vibration suppression filter in a servo control apparatus which drives a servo motor, said method comprising:
   a) detecting a vibration of a control system when the vibration is generated during driving;
   b) performing a frequency analysis on signal which reflects the vibration;
   c) selecting a vibration frequency such that, a vibration energy corresponding to the selected vibration frequency is higher than vibration energies corresponding to vibration frequencies other than said selected vibration frequency in the signal; and
   d) setting a frequency of the vibration suppression filter based on the selected vibration frequency,
   wherein when the selected vibration frequency is higher than a predetermined value, the vibration suppression filter is set to be a notch filter with a center frequency equal to the selected vibration frequency,
   and when the selected vibration frequency is lower than the predetermined value, the vibration suppression filter is set to the frequency so as to cut off frequencies equal to or above the selected vibration frequency.

2. The method according to claim 1,
   wherein the signal is related to a torque or a difference between an estimated speed and a speed.

* * * * *